(12) United States Patent
Hassan

(10) Patent No.: US 10,666,381 B2
(45) Date of Patent: *May 26, 2020

(54) DYNAMICALLY PARTITIONING MEDIA STREAMS

(71) Applicant: Microsoft Technology Licensing, LLC, Redmond, WA (US)

(72) Inventor: Amer Hassan, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/220,930

(22) Filed: Dec. 14, 2018

(65) Prior Publication Data
US 2019/0132078 A1 May 2, 2019

Related U.S. Application Data

(63) Continuation of application No. 15/290,631, filed on Oct. 11, 2016, now Pat. No. 10,187,178.

(51) Int. Cl.
H04L 1/00 (2006.01)
G06F 11/30 (2006.01)
G06F 11/34 (2006.01)
H04L 1/02 (2006.01)

(52) U.S. Cl.
CPC ........ *H04L 1/0009* (2013.01); *G06F 11/3006* (2013.01); *G06F 11/3409* (2013.01); *H04L 1/0033* (2013.01); *H04L 1/0059* (2013.01); *H04L 1/0068* (2013.01); *H04L 1/02* (2013.01); *H04L 2001/0092* (2013.01)

(58) Field of Classification Search
CPC ..................................... H04L 1/0057
USPC ....................... 714/776, 775, 788
See application file for complete search history.

(56) References Cited

U.S. PATENT DOCUMENTS

| | | | |
|---|---|---|---|
| 2006/0109967 A1* | 5/2006 | Kouchri | H04M 7/0084 379/207.02 |
| 2007/0087756 A1* | 4/2007 | Hoffberg | G06Q 10/0631 455/450 |
| 2010/0317420 A1* | 12/2010 | Hoffberg | G06Q 30/0207 463/1 |
| 2017/0055012 A1* | 2/2017 | Phillips | H04L 67/06 |

* cited by examiner

*Primary Examiner* — Fritz Alphonse
(74) *Attorney, Agent, or Firm* — NovoTechIP International PLLC

(57) ABSTRACT

Systems, methods, and software technology for partitioning media streams is disclosed herein. In an implementation, an application partitions an encoded media stream into multiple sub-streams having different code rates relative to each other. The sub-streams may then be transmitted to different wireless access points. A change in a monitored performance of at least one of the wireless access points may drive a modification to the partitioning of the media stream such that the code rates change relative to each other.

20 Claims, 11 Drawing Sheets

| Bit Stream C (1/3) | 1 | 1 | 1 | 0 | 0 | 1 | 1 | 0 | 0 | 0 | 0 | 1 | 0 | 1 | 1 | 1 | 1 | 1 | 0 | 0 | 1 | 1 | 0 | 1 |
|---|---|---|---|---|---|---|---|---|---|---|---|---|---|---|---|---|---|---|---|---|---|---|---|---|
| Partition Code PC1 | 1 | 1 | 0 | 0 | 0 | 1 | 1 | 1 | 0 | 0 | 0 | 1 | 1 | 1 | 0 | 0 | 0 | 1 | 1 | 1 | 0 | 0 | 0 | 1 |
| Sub-Stream C1 (2/3) | 1 | 1 |   |   |   | 1 | 1 | 0 |   |   |   | 1 | 0 | 1 |   |   |   | 1 | 0 | 0 |   |   |   | 1 |
| Sub-Stream C2 (2/3) |   |   | 1 | 0 | 0 |   |   |   | 0 | 0 | 0 |   |   |   | 1 | 1 | 1 |   |   |   | 1 | 1 | 0 |   |

| Bit Stream C (1/3) | 1 | 1 | 1 | 0 | 0 | 1 | 1 | 0 | 0 | 0 | 0 | 1 | 0 | 1 | 1 | 1 | 1 | 1 | 0 | 0 | 1 | 1 | 0 | 1 |
|---|---|---|---|---|---|---|---|---|---|---|---|---|---|---|---|---|---|---|---|---|---|---|---|---|
| Partition Code PC2 | 1 | 0 | 0 | 0 | 1 | 0 | 1 | 0 | 0 | 1 | 1 | 0 | 1 | 0 | 0 | 0 | 1 | 0 | 1 | 0 | 0 | 1 | 1 | 0 |
| Sub-Stream C1 (2/3) | 1 |   |   | 0 |   | 1 |   | 0 | 0 |   |   | 0 |   | 1 | 1 |   |   | 1 |   | 0 | 0 |   |   | 1 |
| Sub-Stream C2 (2/3) |   | 1 | 1 |   | 0 |   | 1 |   |   | 0 | 0 |   | 0 |   |   | 1 | 1 |   | 0 |   |   | 1 | 0 |   |

DYNAMICALLY PARTITIONING MEDIA STREAMS

CROSS-REFERENCE TO RELATED APPLICATIONS

This application is a continuation of U.S. patent application Ser. No. 15/290,631, filed Oct. 11, 2016, entitled "DYNAMICALLY PARTITIONING MEDIA STREAMS," which is incorporated herein by reference in its entirety for all purposes.

TECHNICAL BACKGROUND

Error correction encoding is employed in a variety of settings to improve the reliability of data. At a basic level, error correction encoding introduces redundancy into a bit stream to increase the probability that the information in the bit stream is transferred successfully from one end of a channel to another. For example, error correction encoding is used when data is written to disk, communicated wirelessly, or otherwise transferred over a noisy channel that introduces errors into the data.

While typically employed in the lower layers of a communications stack, some applications employ error correction to improve the reliability of their data. Voice and video applications may encode their media streams, for example, to ensure that their conversations, video clips, or other such content reach their destination intact. An encoded media stream will have a level of redundancy that may be expressed in terms of a code rate. For instance, a one-half code rate would indicate that half of the bits in an encoded media stream are redundant relative to the original bits in the stream.

Even when an application protects its media stream with error correction encoding, the media stream may still be at risk due to the fundamental characteristics of the channel being used to communicate the data. This may especially be the case when relying upon a single wireless link between a client and a wider network for communications that are sensitive to delay.

Overview

Technology is disclosed herein that partitions an encoded media stream into multiple sub-streams having different code rates relative to each other. The sub-streams may then be transmitted to different wireless access points. A change in a monitored performance of at least one of the wireless access points may drive a modification to the partitioning of the media stream such that the code rates change relative to each other. In this manner, the media stream may be more reliably communicated to a receiving end, even as the performance of a given wireless access point or points varies.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 6A illustrates a stage in a partitioning process in an implementation.

FIG. 6B illustrates a stage in a partitioning process in an implementation.

TECHNICAL DISCLOSURE

Technology is disclosed herein that allows a media stream to be partitioned into sub-streams having different code rates relative to each other, and then transmitted over different wireless access points respectively for delivery to a destination. Utilizing different code rates for different wireless access points may have the technical effect of increasing the overall reliability and efficiency of the media stream.

In some implementations, the media stream is a compressed and encoded bit stream that is provided to a partition process. The bit stream is already encoded at one code rate or level of redundancy. The partition process splits the bit stream in accordance with a partition schema such that the resulting bit streams each have a different code rate relative to each other and relative to the original code rate. But when combined at the receiving end, the combined bit stream will have a code rate the same as the original code rate.

As a multimedia session that generates the media stream progresses, the performance characteristics of the wireless links carrying the session may change. As the performance of a given link changes, so can the partition schema. For example, as the quality of one link goes down, the level of redundancy for the sub-stream being transmitted over that link may be increased, to accommodate for the drop in quality. Thus, the original bit stream may be partitioned so that the code rate of the affected sub-stream is increased. Conversely, if the quality of the link improves, less redundancy is needed and the partitioning schema may be adjusted to reduce the code rate of the affected sub-stream. Examples of multimedia sessions include, but are not limited to, voice calls, video calls, voice/video conferences, whiteboard sessions, text and video chats, data uploads (e.g. video and photo uploading), file sharing sessions, and any combination or variation thereof.

In some implementations, the partition schema is determined on-board the computing device that generates the media stream and performs the encoding and partitioning (e.g. a mobile phone, tablet, laptop, desktop, or other such computer). However, in other implementations the local computing device hosting the multimedia session may offload such a determination to a remote service ("in the cloud"). The service may evaluate performance characteristics of the links to ascertain a partition schema for splitting a media stream into subsequent sub-streams.

Figure 1A:
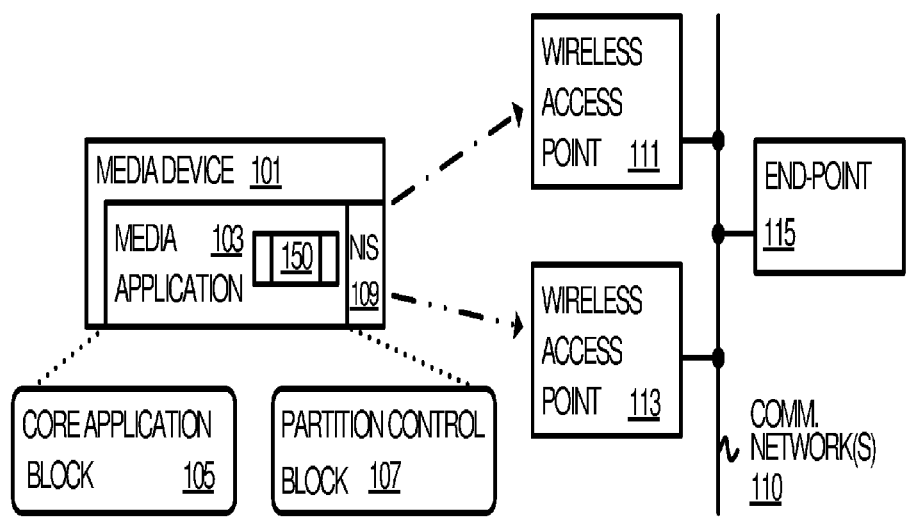
FIG. 1A illustrates an operational environment in an implementation of media stream partitioning.

FIG. 1A illustrates operating environment 100 in an implementation of dynamic partitioning technology for media streams. Operating environment 100 includes a media device 101, communication network 110, wireless access point 111, wireless access point 113, and end-point 115. Media device 101 includes various hardware and software elements that interoperate to communicate with end-points (e.g. end-point 115) over communication network 110. Wireless access points 111 and 113 provide media device 101 with access to communication network 110.

Figure 7:
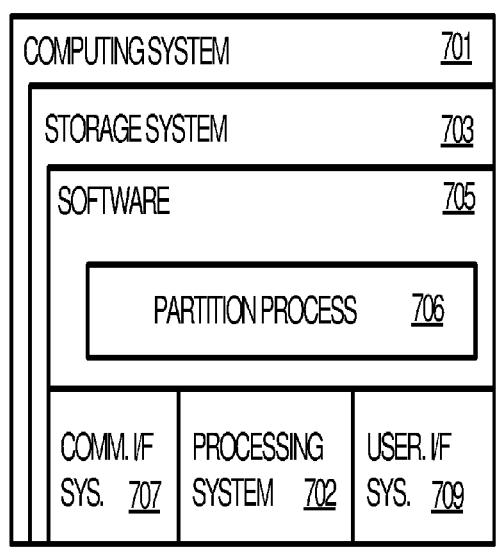
FIG. 7 illustrates a computing system suitable for implementing the dynamic partitioning technology disclosed herein, including any of the environments, architectures, elements, processes, and operational scenarios and sequences illustrated in the Figures and discussed below in the Technical Disclosure.

Media device 101 is representative of any computing system or systems capable of hosting a media application 103, of which computing system 701 in FIG. 7 is representative. Examples include, but are not limited to, mobile phones, smart phones, tablet computer, laptop computers, desktop computers, and any other physical or virtual computer, variation, or combination thereof.

Media device 101 includes a media application 103 and a network interface system 109. Media application 103 is representative of any application implemented in software that is capable of employing a partition process, of which partition process 150 is representative, and communicating partitioned media streams over communication network 110. Examples of media application 103 include telephony applications (voice and video calling), messaging applications, and chat applications, as well as any variation or combination thereof. Media application 103 may be implemented as a stand-alone application, as a distributed application, or as an integrated component of one or more other applications.

Media device 101 may include other software, such as an operating system, that operates at a layer below media application 103. That is, media application 103 may be considered to operate at an application layer of a software stack, with operating system elements residing a layer or more below the application layer. Thus, media application 103 communications through the operating system to reach network interface system 109.

Network interface system 109 is representative of any hardware and/or software components of media device 101 that support communication with wireless access points. Network interface system 109 may include a network interface card, for example, as well as the associated software and/or firmware that programmatically drive the operations of the network interface card. In some implementations, network interface system 109 may include multiple network interface cards to allow for simultaneous communication with multiple wireless access points. In other implementations, network interface system 109 may include multiple virtual (or virtualized) network interface cards. In either case, network interface system 109 includes the necessary hardware and software components that, from the perspective of media application 103, support the ability of media application 103 to direct partitioned media streams (and their sub-streams) to multiple wireless access points.

Media application 103 itself may be comprised of various components, modules, or other such functional blocks implemented in program instructions that, in the aggregate, provide the features and functionality of the application, of which core application block 105 is representative. Core application block 105 may include, for example, software logic that drives a user experience, produces and consumes media streams, and otherwise allows a user to communicate with other users at their respective end-points.

Media application 103 also includes partition control block 107, which is representative of any component(s) or module(s) in media application 103 capable of partitioning a compressed and encoded (or un-encoded) media stream into sub-streams having different code rates relative to each other. Partition control block 107 may also be implemented in program instructions that are executed in the context of running media application 103 on media device 101.

Wireless access point 111 and wireless access point 113 are each representative of any devices suitable for receiving wireless signals from and transmitting wireless signals to media device 101. Examples include, but are not limited to, wireless base stations that operate in accordance with one or more wireless local area network (WLAN) standards and specifications, commonly referred to as WiFi and identified under the 802.11 family. Other examples include cellular base stations that operate in accordance with one or more cellular protocols, such as Long-Term Evolution (LTE), Global System for Mobile Communications (GSM), Code Division Multiple Access (CDMA), Universal Mobile Telecommunication System (UMTS), or any variation or combination thereof.

Communication network 110 is representative of one or more networks that communicatively coupled wireless access points 111 and 113 to end-points, such as end-point 115. Communication network 110 may comprise a local area network (LAN) or LANs, a wide area network (WAN) or WANs, a wired network, a wireless network, an intranet or intranets, the Internet, and any combination and variation thereof.

End-point 115 is representative of any computing system or systems with which media device 101 may communicate. Examples include other devices having corresponding applications or services installed thereon, such that an operating user of media device 101 may be able to have a conversation with a corresponding user of the end-point 115. Other examples include media servers, web servers, and other types of end-points that media device 101 may transmit data to or receive data from.

Figure 1B:
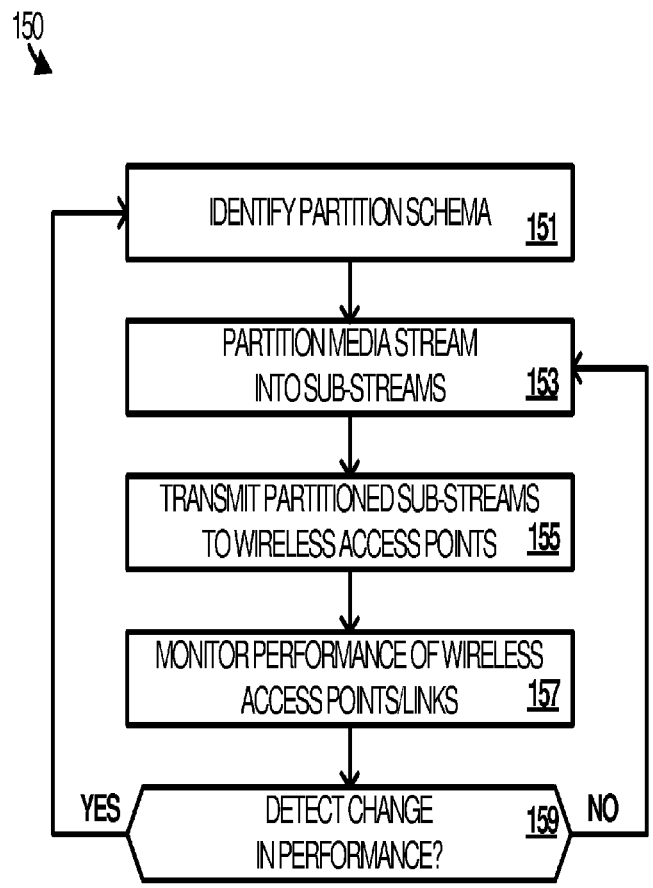
FIG. 1B illustrates a partition process employed by a media application in an implementation of media stream partitioning.

FIG. 1B illustrates partition process 150 in more detail which, as mentioned, may be employed by media application 103 to provide partitioning capabilities for media streams. Partition process 150 may be implemented in program instructions in the context of modules or components of media application 103, including partition block 107, or other such programming elements that constitute media application 103. The program instructions direct media device 101 to provide partitioning for media streams as follows.

Referring parenthetically to the steps illustrated in FIG. 1B, a media application under the control of partition process 150 identifies a partition schema to apply to a media stream for an ongoing media session between the media application and another end-point (e.g. another media application, a server, or the like) (step 151). The media application may identify the partition schema itself, by referencing local information that specifies which partition schema to utilize under which circumstances. In other implementations, the media application may communicate with a remote service to identify the partition schema, allowing the determination of the schema to be offloaded to the remote service. In yet another implementation, the media application may query another application or software component (e.g. an operating system element) external to the application to identify the partition schema.

The partition schema specifies how the media application is to partition an encoded or un-encoded media stream. The media stream may comprise a compressed bit stream or a compressed and encoded bit stream. The partition schema specifies at what interval to split the bit stream into multiple bit streams. For example, the partition schema may specify that the bit stream be split evenly into two or more streams, weighted unevenly amongst two or more streams, or otherwise partitioned. In a simple example, one-quarter of the bits may be allocated to one sub-stream, while three-quarters of the bits may be allocated to another sub-stream.

The media application partitions the sub-stream accordingly (step 153), such that each sub-stream has a code rate that differs relative to the other sub-streams. In the case of a compressed and encoded bit stream, the resulting sub-streams from the partition will remain in an encoded state and, due to the partitioning, will exhibit different code rates relative to each other. In the case of a compressed but un-encoded bit stream, the partitioned sub-streams are routed through one or more encoding blocks that can apply error correction encoding to the partitioned sub-streams. The output from the encoding bock(s) would thus be multiple compressed and encoded sub-streams partitioned from the original bit stream and having different code rates relative to each other.

The partitioned sub-streams are then transmitted to multiple wireless access points for transport over a network(s) to an endpoint (step 155). Each sub-stream is transmitted to a different wireless access point. For example, one sub-stream partitioned from a bit stream may be transmitted to one wireless access point, while another sub-stream partitioned from the same bit stream may be transmitted to another wireless access point, and so on if more than two wireless access points are utilized.

The performance of each wireless access point or respective channel/link is monitored by the media application (step 157). This may involve, for example, receiving a signal strength metric, a signal-to-noise ratio, available bandwidth, latency, jitter, packet loss, or other such information from a reporting element that actively monitors signal characteristics. The application analyzes the information to determine if the monitored performance of a given channel, link, or access point has changed (step 159), such as by comparing a metric or ratio to a threshold, range, pre-defined value, or other criteria. If the performance has changed, then the media application returns to step 151 to identify a new partition schema. If the performance has not changed, then the media application may continue to partition the media stream per the previously ascertained partition schema.

Figure 1C:
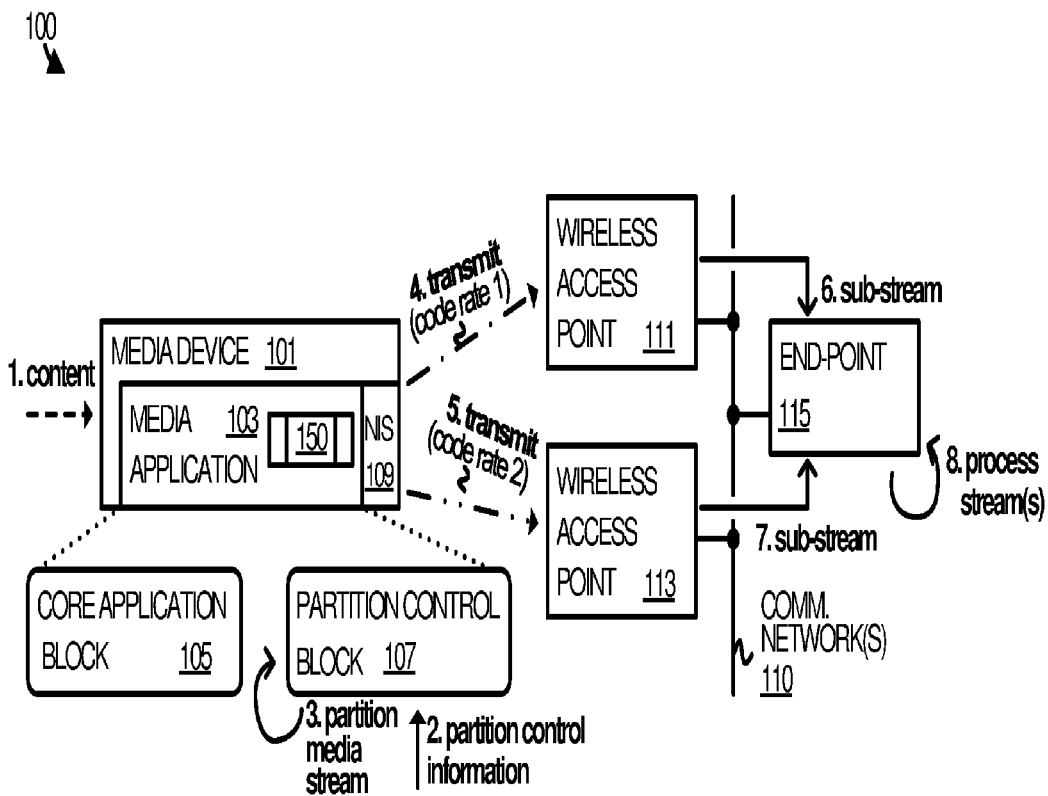
FIG. 1C illustrates an operational scenario in an implementation.

FIG. 1C illustrates an operational scenario that may occur in the context of operational environment 100 as media application 103 executes partition process 150. In operation, media application 103 receives media from which it produces a media stream. The incoming media may be, for example, audio captured by an audio device on media device 101, video captured by a video device, content from disk, content from memory, or any other type of media that media application 103 may be capable of transmitting. Core application block 105 operates on the media to compress the bit stream, encode the compressed bit stream (optionally), and otherwise apply application logic to provide an associated user experience for an end-user.

In the meantime, partition control block 107 receives partition control information that specifies a partition schema for partitioning the media stream. The partition control information may be derived locally, received from a remote source, or obtained from another element external to communication element 103. As partition control block 107 receives the media stream, it partitions the media stream into sub-streams in accordance with the partition schema. The partitioned sub-streams are then passed to network interface system 109 to be transmitted to wireless access points 111 and 113.

One sub-stream having a first code rate is transmitted to wireless access point 111. The other sub-stream having a second code rate that differs relative to the first code rate is transmitted to wireless access point 113. Wireless access point 111 communicates the first sub-stream over communication network 110 for delivery to end-point 115. Likewise, wireless access point 113 also communicates the second sub-stream over communication network 110 for delivery to end-point 115.

From the perspective of end-point 115, the end-point will receive the sub-streams as a single media stream. Or at least, it will not be apparent to end-point 115 that the original media stream has been transmitted as multiple sub-streams. End-point 115 may thus apply corresponding decoding procedures to decode the received bits. Even if only one sub-stream is received, end-point 115 will be able to decode the received bits and restore the original information represented in the media stream, albeit at a potentially lesser quality. If only parts of each sub-stream are received, end-point 115 will be able to restore the original information, although again at a lesser quality or fidelity. If all of the bits for both sub-streams are communicated successfully, then end-point 115 will be able to decode the bits and restore the original information in its entirety and at its original fidelity.

Figure 2:
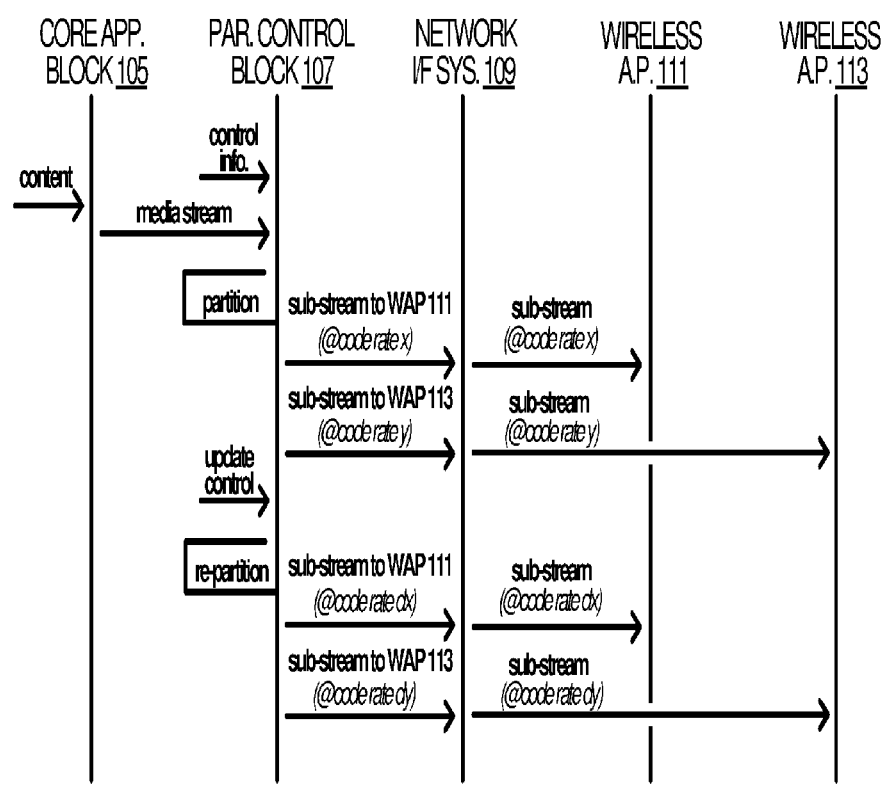
FIG. 2 illustrates an operational sequence in an implementation.

FIG. 2 illustrates an operational sequence 200 to again demonstrate various aspects of the partition technology disclosed herein with respect to operational environment 100. In operational sequence 200, core application block 105 receives content, such as audio data, video data, images, text, or any other content that may be output in the form of a media stream. Core application block 105 compresses the media stream and provides the compressed media stream to partition control block 107. In the meantime, partition control block 107 was been provided with control information for partitioning the media stream.

Partition control block 107 partitions the compressed media stream per the partition scheme identified in the control information. A first sub-stream is produced and sent to network interface system 109, to be communicated to wireless access point 111. The first sub-stream is at code rate "x." A second sub-stream is produced and sent to network interface system 109 having a code rate "y," which differs from code rate "x." The second sub-stream is transmitted to wireless access point 113.

At least some or a portion of each sub-stream is communicated by the wireless access points 111 and 113 to an end-point, with the intention of the sub-streams being combined at the receiving end such that the bit streams may be decoded, decompressed, and played out to an end-user. However, at some point during the transmission (e.g. during a call), partition control block 107 may receive an update to the control information it was initially provided that specifies a new partition scheme. Accordingly, and mid-call, partition control block 107 partitions (or re-partition) the media stream in accordance with the new partition scheme, meaning that the code rates change.

For example, a third sub-stream (subsequent to the first and second sub-streams) is produced having a code rate of "dx." A fourth sub-stream (also subsequent to the first and second sub-streams) is produced having a code rate of "dy," which differs from "dx." The third sub-stream is provided to network interface system 109 for transmission to wireless access point 111, while the fourth sub-stream is provided to network interface system 109 for transmission to wireless access point 113. As occurs earlier in the call, at least some or a portion of each sub-stream is communicated by the wireless access points 111 and 113 to an end-point, with the intention of the sub-streams being combined at the receiving end such that the bit streams may be decoded, decompressed, and played out.

Figure 3A:
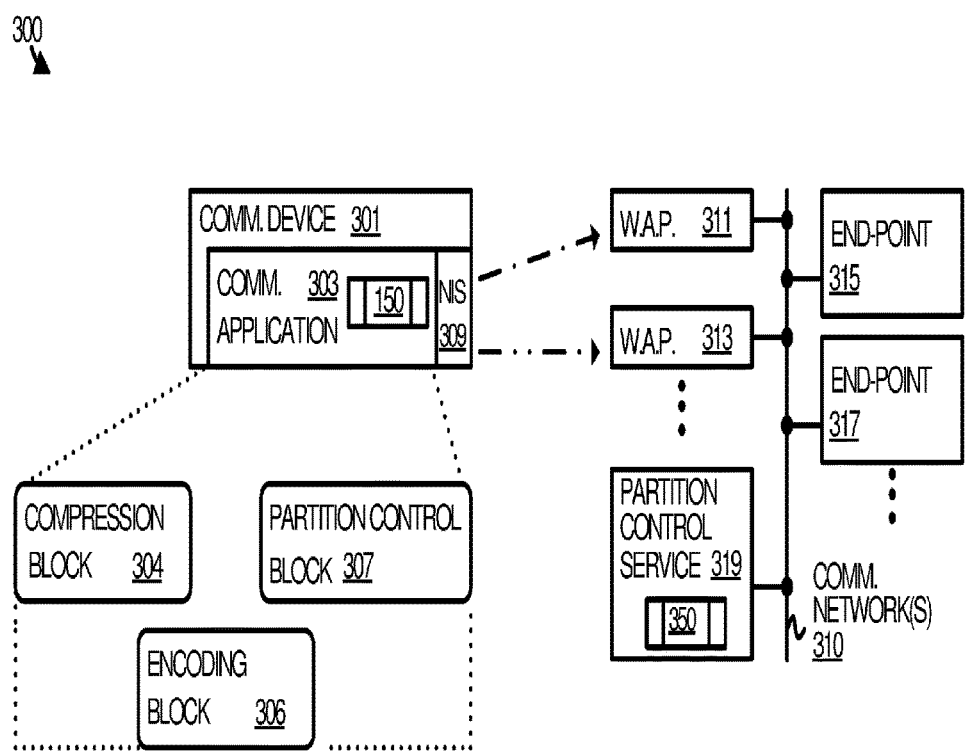
FIG. 3A illustrates an operational environment in an implementation of media stream partitioning.

FIG. 3 illustrates operational environment 300 in another implementation of partitioning technology for media streams, as well as an associated operational scenario. Operational environment 300 includes communication device 301, communication network 310, wireless access point 311, wireless access point 313, end-point 315, end-point 317, and partition control service 319.

Communication device 301 is representative of any computing system or systems capable of hosting a communication application 303, of which computing system 701 in FIG. 7 is representative. Examples include, but are not limited to, mobile phones, smart phones, tablet computer, laptop computers, desktop computers, and any other physical or virtual computer, variation, or combination thereof.

Communication device 301 includes communication application 303 and network interface system 309. Communication application 303 is representative of any application implemented in software that is capable of employing a partition process, of which partition process 150 is representative, and communicating partitioned media streams over communication network 310. Examples of communication application 303 include telephony applications (voice and video calling), messaging applications, and chat applications, as well as any variation or combination thereof. Communication application 303 may be implemented as a stand-alone application, as a distributed application, or as an integrated component of one or more other applications. Commercial examples of communication application 303 include, but are not limited to, Skype® and Skype for Business®, Apple iMessage® and FaceTime®, Google Chat™ and Hangouts™, WhatsApp®, and Facebook® Messenger, among other similar applications.

Communication device 301 may include other software, such as an operating system, that operates at a layer below communication application 303. Communication application 303 may thus be considered to operate at an application layer of a software stack, with operating system elements residing a layer or more below the application layer.

Network interface system 309 is representative of any hardware and/or software components of communication device 301 that support communication with wireless access points. Network interface system 309 may include a network interface card, multiple network interface cards to allow for simultaneous communication with multiple wireless access points, or multiple virtual (or virtualized) network interface cards. In any case, network interface system 309 includes hardware and software components that support the ability of communication application 303 to direct partitioned media streams (and their sub-streams) to multiple wireless access points.

Communication application 303 includes a compression block 304 that performs compression on a media stream input to communication device 303 (e.g. voice, video, images, or other content). Communication application 303 also includes an encoding block 306 for encoding the compressed media stream and a partition control block 307 for partitioning the compressed and encoded media stream. Partition process 150 may be implemented by communication application 303 in program instructions in the context of its modules or components, including partition control block 307.

Wireless access point 311 and wireless access point 313 are each representative of any devices suitable for receiving wireless signals from and transmitting wireless signals to communication device 301. Examples include, but are not limited to, wireless base stations that operate in accordance with one or more wireless local area network (WLAN) standards and specifications, commonly referred to as WiFi and identified under the 802.11 family Other examples include cellular base stations that operate in accordance with one or more cellular protocols, such as Long-Term Evolution (LTE), Global System for Mobile Communications (GSM), Code Division Multiple Access (CDMA), Universal Mobile Telecommunication System (UMTS), or any variation or combination thereof.

Communication network 310 is representative of one or more networks that communicatively couple wireless access points 311 and 313 to end-points, such as end-points 315 and 317. Communication network 310 may comprise a local area network (LAN) or LANs, a wide area network (WAN) or WANs, a wired network, a wireless network, an intranet or intranets, the Internet, and any combination and variation thereof.

End-points 315 and 317 are each representative of any computing system or systems with which communication device 301 may communicate. Examples include other communication devices (e.g. mobile phones, tablets, laptops, etc.), media servers, web servers, and other types of end-points that communication device 301 may transmit data to or receive data from.

Figure 3B:
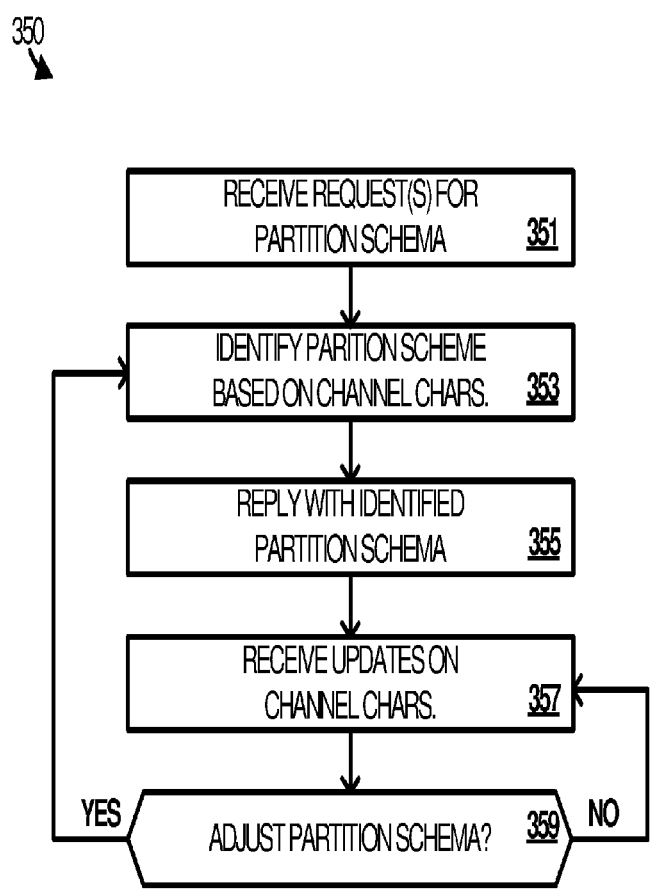
FIG. 3B illustrates a partition process employed by a communication application in an implementation of media stream partitioning.

Partition control service 319 is representative of any service implemented on software on a suitable computing system (of which computing system 701 in FIG. 7 is representative) that is capable of employing partition process 350. Partition process 350 may be implemented in program instructions in the context of applications, modules, or components of partition control service 319. FIG. 3B illustrates partition process 350 in more detail which drives partition control service 319 to operates as follows.

In operation, a partition control service employing partition process 350 receives requests for the service to identify a partition schema (step 351). The requests may originate from, for example, end-points that are engaged in a media session (e.g. voice or video call, movie streaming, file uploads, etc.) and identify characteristics of a set of channels over which the media session will flow. Examples of channel characteristics include, but are not limited to, signal to noise ratios of wireless access links, signal strength, the identity of the wireless access points being used, and channel type.

The partition control service responsively identifies a partition schema for the end-point to apply based on the channel characteristics identified in the request (step 353) and replies to the end-point with the partition schema (355). The partition schema indicates to the end-point how a given media stream is to be partitioned with respect to the multiple channels over which the resulting sub-streams will be transmitted.

The end-point will proceed to engage in the media session, during which the characteristics of the wireless channels supporting the session may change. The signal to noise ratio, signal strength, congestion level, or other such characteristics of one or more wireless access points may increase or decrease, for example. The end-point may update the partition control service on the performance changes (step 357), in response to which the service determines whether or not to adjust the partition schema (step 359).

If the change in performance is such that a new partition schema is warranted, then the partition control service returns to step 353, at which it identifies the appropriate schema and updates the end-point. If the change in performance does not warrant a new partition schema, then the service returns to step 357 and continues to monitor the updates on the performance provided by the end-point.

Figure 3C:
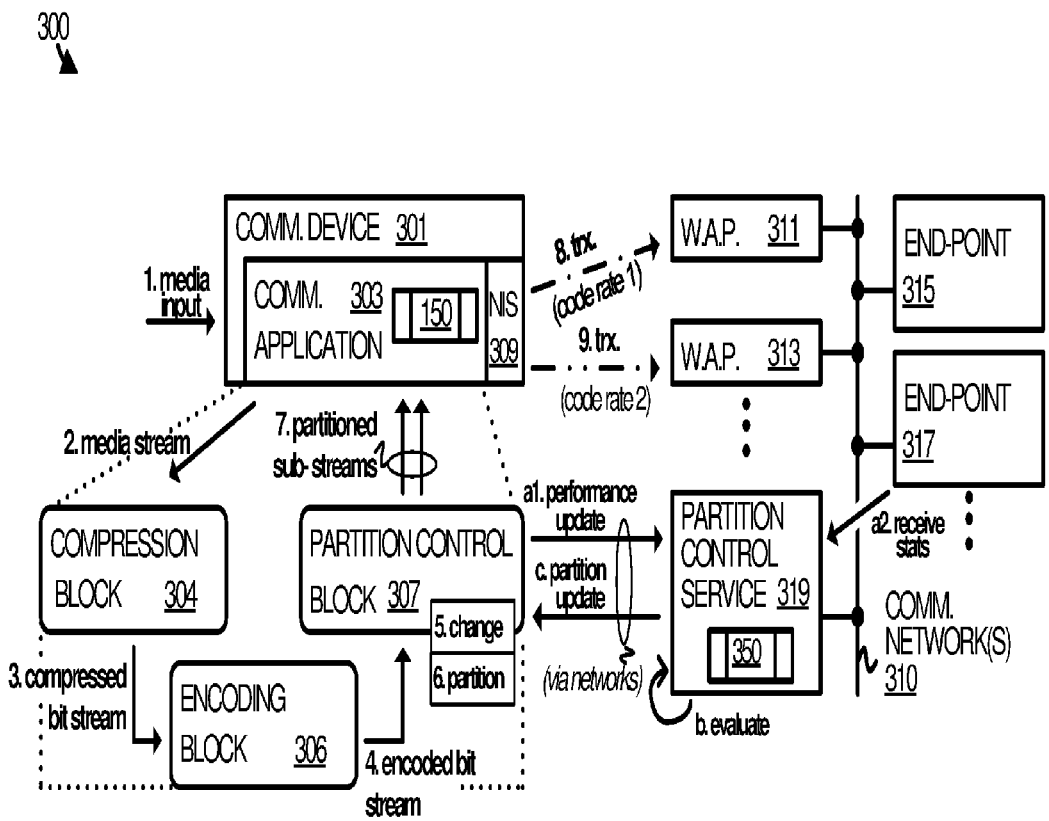
FIG. 3C illustrates an operational scenario in an implementation.

FIG. 3C illustrates an operational scenario that may occur in the context of operational environment 300 as communication application 303 executes partition process 150 and partition control service 319 executes partition process 350.

In operation, media is input to communication application 303 by way of a microphone, camera, from disk, or from some other source. Communication application 303 processes the media to produce a media stream. Compression block 304 compresses the media stream into a compressed bit stream, which may then be passed to encoding block 306. Encoding block 306 performs forward error correction (FEC) encoding on the compressed bit stream to produce a compressed and encoded bit stream.

In the meantime, partition control block 307 is provided with a partition schema from partition control service 319. Partition block 307 receives the compressed and encoded bit stream from encoding block 306 and partitions the bit stream per the partition schema. The resulting sub-streams are provided to network interface system 309 to be transmitted to wireless access points 311 and 313 respectively. Wireless access points 311 and 313 each receive an individual one of the sub-streams and sends the sub-stream over communication network 310 for delivery to one or more of end-points 315 and 317. At least some or a portion of both sub-streams is received at each end-point, which may then decode and decompress the combined bit stream for play-out to a user.

As the media session progresses, partition control block 307 provides performance updates to partition control service 319 on the performance of the various wireless links supporting the session. In addition, partition control service 319 may (optionally) receive performance statistics from one or more of end-points 315 and 317 indicative of the quality of the session from their perspective. Partition control service 319 factors the updates and statistics into a determination of whether or not to alter the partition schema. Accordingly, the service provides partition control block 307 with an update that indicates any change to the partition schema. Partition control block 307 may change how the media stream is partitioned if necessitated by the update.

Figure 4:
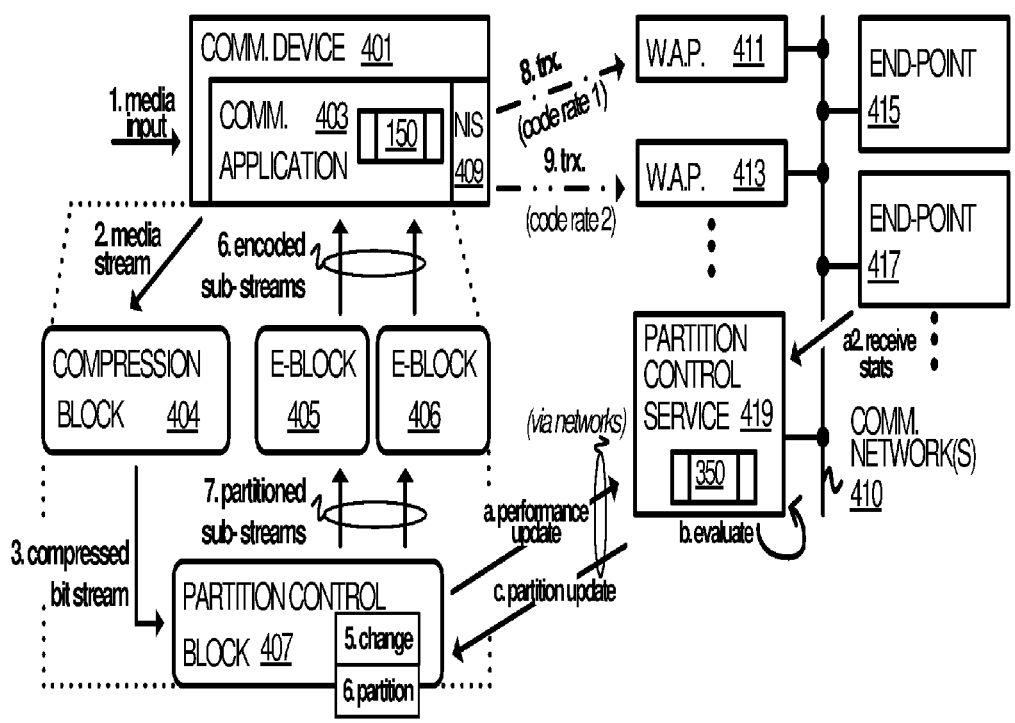
FIG. 4 also illustrates another operational environment and associated scenario in an implementation of media stream partitioning.

FIG. 4 illustrates operational environment 400 in another implementation of partitioning technology for media streams, as well as an associated operational scenario. Operational environment 400 includes communication device 401, communication network 410, wireless access point 411, wireless access point 413, end-point 415, end-point 417, and partition control service 419.

The elements of operational environment 400 are similar to the correspondingly numbered elements of operational environment 300 (i.e. communication device 401 corresponds to communication device 301), with the exception of communication application 403, which differs relative to communication application 303.

Communication application 403 includes a compression block 404 that performs compression on a media stream input to communication application 403 (e.g. voice, video, images, or other content). Communication application 403 also includes multiple encoding blocks represented by encoding block 405 and encoding block 406. But the encoding blocks follow partition control block 407 in the bit steam flow from compression block 404 to network interface system 409.

In operation, communication application 403 and partition control service 419 employ partition process 150 and partition process 350 respectively as follows.

To begin, media is input to communication application 403 by way of a microphone, camera, from disk, or from some other source. Communication application 403 processes the media to produce a media stream. Compression block 404 compresses the media stream into a compressed bit stream, which may then be passed to partition control block 407. Partition block 407 receives the compressed and un-encoded bit stream from encoding block 406 and partitions the bit stream per the partition schema.

Partition block 407 then passes the resulting sub-streams to encoding block 405 and encoding block 406 respectively (one sub-stream to each encoding block). Encoding block 405 encodes its partitioned sub-stream using FEC encoding and passes the compressed and encoded sub-stream to network interface system 409. Similarly, encoding block 406 encodes its partitioned sub-stream using FEC encoding and passes the compressed and encoded sub-stream to network interface system 409. Each sub-stream is transmitted to a different one of wireless access points 411 and 413 for delivery to one or more of end-points 415 and 417 via communication network 410.

As the media session progresses, partition control block 407 may provide performance updates to partition control service 419 on the performance of the various wireless links supporting the session. In addition, partition control service 419 may (optionally) receive performance statistics from one or more of end-points 415 and 417 indicative of the quality of the session from their perspective. Partition control service 419 factors the updates and statistics into a determination of whether or not to alter the partition schema. Accordingly, the service provides partition control block 407 with an update that indicates any change to the partition schema. Partition control block 407 may change how the media stream is partitioned if necessitated by the update.

Figure 5:
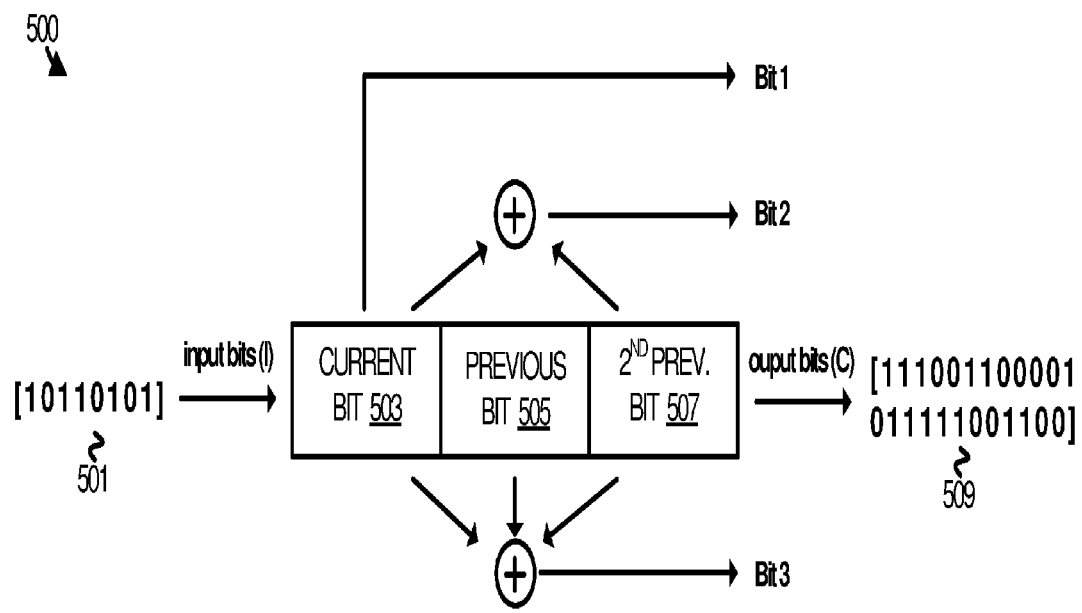
FIG. 5 illustrates an encoding process in an implementation.

FIG. 5 illustrates an encoding process 500 in an implementation which, in conjunction with FIGS. 6A-6B, demonstrate various aspects of media stream partitioning. With respect to encoding process 500, a media stream 501 may be input to the process. The media stream 501 includes a set of input bits [10110101].

Any current bit 503 may be redundantly encoded by replicating the current bit, performing an AND operation on the current bit 503 and the $2^{nd}$ previous bit 507 relative to the current bit 503, and performing an AND operation on the current bit 503, the previous bit 505, and the $2^{nd}$ previous bit 507. Thus, input bits [10110101] produce an encode output bit stream of [111001100001011111001100]. Such encoding produces an encoded bit stream at a 1/3 code rate.

In FIG. 6A, the encoded bit stream from FIG. 5 is input to a partition process 600A, which partitions the encoded bit stream into sub-streams using a partition code (schema). In this example, the first partition code PC1 is [110001110001110001110001]. The first partition code may be used to allocate a given bit from the encoded bit stream to either the first sub-stream C1 or the second sub-stream C2. The partitioning results in an equal partitioning such that each sub-stream has a 2/3 code rate. This may be desirable when, for instance, the quality and performance of two or more wireless links are similar.

For example, wherever the first partition code has a "1," its corresponding bit from the encoded bit stream is allocated to the first sub-stream C1. Wherever the first partition code has a "0," the corresponding bit from the encoded bit stream is allocated to the second sub-stream C2. Accordingly, the partitioning produces a sub-stream C1 of [111101011001] and a sub-stream C2 of [100000111110.]

As discussed above, the partition schema may change over time. Partition process 600B illustrates what may occur when the partition code changes from PC1 to PC2. PC2 is given by [100010100110100010100110]. Applying PC2 again the same encoded bit stream for exemplary purposes results in a C1 of [1010001010] and a C2 of [11010011111011.]

It may be appreciated that whereas PC1 results in sub-streams of equal length (12 bits), PC2 results in sub-streams of different lengths (10 and 14 respectively). Thus, PC2 is modeled so as to provide greater redundancy over one wireless link versus another. This may be desirable when the quality and performance of one is worse than another. In fact, C1 has a code rate of 4/5 (10 bits produced from 8 bits) while C2 has a code rate of 4/7 (14 bits produced from 8 bits).

PC1 and PC2 may in some implementations be stored in a look-up table maintained by a client application. The table may have a set of PC1 vectors at different lengths that are indexed during transmission. That is, the client includes in transmission the index of a partition vector. The look-up table may be updated at certain intervals by a remote partition service (in the cloud), thereby allowing the partition service to search for optimal partition vectors over time. When new vectors are discovered that are better than previous ones, they may be pushed down to clients.

FIG. 7 illustrates computing system 701, which is representative of any system or collection of systems in which the various applications, services, scenarios, and processes disclosed herein may be implemented. Examples of computing system 701 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 701 may be implemented as a single apparatus, system, or device or may be implemented in a distributed manner as multiple apparatuses, systems, or devices. Computing system 701 includes, but is not limited to, processing system 702, storage system 703, software 705, communication interface system 707, and user interface system 709. Processing system 702 is operatively coupled with storage system 703, communication interface system 707, and user interface system 709.

Processing system 702 loads and executes software 705 from storage system 703. Software 705 includes partition process 706, which is representative of the processes discussed with respect to the preceding FIGS. 1-7, including partition process 150 and partition process 350. When executed by processing system 702 to provide media stream partitioning, software 705 directs processing system 702 to operate as described herein for at least the various processes, operational scenarios, and sequences discussed in the foregoing implementations. Computing system 701 may optionally include additional devices, features, or functionality not discussed for purposes of brevity.

Referring still to FIG. 7, processing system 702 may comprise a micro-processor and other circuitry that retrieves and executes software 705 from storage system 703. Processing system 702 may be implemented within a single processing device, but may also be distributed across multiple processing devices or sub-systems that cooperate in executing program instructions. Examples of processing system 702 include general purpose central processing units, application specific processors, and logic devices, as well as any other type of processing device, combinations, or variations thereof.

Storage system 703 may comprise any computer readable storage media readable by processing system 702 and capable of storing software 705. Storage system 703 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 703 may also include computer readable communication media over which at least some of software 705 may be communicated internally or externally. Storage system 703 may be implemented as a single storage device, but may also be implemented across multiple storage devices or sub-systems co-located or distributed relative to each other. Storage system 703 may comprise additional elements, such as a controller, capable of communicating with processing system 702 or possibly other systems.

Software 705 may be implemented in program instructions and among other functions may, when executed by processing system 702, direct processing system 702 to operate as described with respect to the various operational scenarios, sequences, and processes illustrated herein. For example, software 705 may include program instructions for implementing a media application (e.g. media application 103 and communication applications 303 and 403) and/or a partition control service (e.g. partition control service 319 and 419).

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 705 may include additional processes, programs, or components, such as operating system software, virtual machine software, or other application software, in addition to or that include partition process 706. Software 705 may also comprise firmware or some other form of machine-readable processing instructions executable by processing system 702.

In general, software 705 may, when loaded into processing system 702 and executed, transform a suitable apparatus, system, or device (of which computing system 701 is representative) overall from a general-purpose computing system into a special-purpose computing system customized to provide media stream partitioning and/or control. Indeed, encoding software 705 on storage system 703 may transform the physical structure of storage system 703. The specific transformation of the physical structure may depend on various factors in different implementations of this description. Examples of such factors may include, but are not limited to, the technology used to implement the storage media of storage system 703 and whether the computer-storage media are characterized as primary or secondary storage, as well as other factors.

For example, if the computer readable storage media are implemented as semiconductor-based memory, software 705 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 707 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 709 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 709. In some cases, the input and output devices may be combined in a single device, such as a display capable of displaying images and receiving touch gestures. The aforementioned user input and output devices are well known in the art and need not be discussed at length here.

User interface system 709 may also include associated user interface software executable by processing system 702 in support of the various user input and output devices discussed above. Separately or in conjunction with each other and other hardware and software elements, the user interface software and user interface devices may support a graphical user interface, a natural user interface, or any other type of user interface.

Communication between computing system 701 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

The invention claimed is:

1. A device comprising:
 a processor; and
 a memory in communication with the processor, the memory comprising executable instructions that, when executed by the processor, cause the processor to control the device to perform functions of:
  partitioning a media stream for a multimedia session into a plurality of sub-streams having code rates that are different from each other, respectively;

transmitting the plurality of sub-streams to a plurality of remote devices, respectively;
monitoring performances of the remote devices; and
implementing, in response to a change to the performances of the remote devices, a modification to the code rates of the sub-streams.

2. The device of claim 1, wherein:
the device is in communication with a partition control service configured to determine a schema for partitioning the media stream, and
the instructions, when executed by the processor, further cause the processor to control the device to perform a function of reporting, to the partition control service, the monitored performances of the remote devices, the partition control service determining the schema based on the monitored performances of the remote devices.

3. The device of claim 2, wherein:
the partition control service is further configured to identify the modification implemented to the code rates of the sub-streams, and
the instructions, when executed by the processor, further cause the processor to control the device to perform a function of receiving, from the partition control service, an update to the schema.

4. The device of claim 1, wherein:
the media stream comprises a compressed and encoded bit stream, and
the multimedia session comprises a phone call.

5. The device of claim 4, wherein:
the compressed and encoded bit stream comprises a plurality of information bits and a plurality of redundant bits, and
each sub-stream comprises a different subset of the information bits and a different subset of the redundant bits.

6. The device of claim 1, wherein:
the media stream comprises a compressed and un-encoded bit stream, and
each sub-stream comprises a compressed and encoded bit stream.

7. The device of claim 6, wherein the compressed and encoded bit stream of each sub-stream comprises a plurality of redundant bits and a different subset of a plurality of information bits.

8. A non-transitory computer readable medium containing instructions which, when executed by a processor, cause a device to perform functions of:
partitioning a media stream for a multimedia session into a plurality of sub-streams having code rates that are different from each other, respectively;
transmitting the plurality of sub-streams to a plurality of remote devices, respectively;
monitoring performances of the remote devices; and
implementing, in response to a change to the performances of the remote devices, a modification to the code rates of the sub-streams.

9. The non-transitory computer readable medium of claim 8, wherein:
the device is in communication with a partition control service configured to determine a schema for partitioning the media stream, and
the instructions, when executed by the processor, further cause the processor to control the device to perform a function of reporting, to the partition control service, the monitored performances of the remote devices, the partition control service determining the schema based on the monitored performances of the remote devices.

10. The non-transitory computer readable medium of claim 9, wherein:
the partition control service is further configured to identify the modification implemented to the code rates of the sub-streams, and
the instructions, when executed by the processor, further cause the processor to control the device to perform a function of receiving, from the partition control service, an update to the schema.

11. The non-transitory computer readable medium of claim 8, wherein:
the media stream comprises a compressed and encoded bit stream, and
the multimedia session comprises a phone call.

12. The non-transitory computer readable medium of claim 11, wherein:
the compressed and encoded bit stream comprises a plurality of information bits and a plurality of redundant bits, and
each sub-stream comprises a different subset of the information bits and a different subset of the redundant bits.

13. The non-transitory computer readable medium of claim 8, wherein:
the media stream comprises a compressed and un-encoded bit stream, and
each sub-stream comprises a compressed and encoded bit stream.

14. The non-transitory computer readable medium of claim 13, wherein the compressed and encoded bit stream of each sub-stream comprises a plurality of redundant bits and a different subset of a plurality of information bits.

15. The non-transitory computer readable medium of claim 8, wherein:
the media stream comprises a video stream, and
the multimedia session comprises a phone call.

16. A method of operating a device in communication with a partition control service, the method comprising:
partitioning a media stream for a multimedia session into a plurality of sub-streams having code rates that are different from each other, respectively;
transmitting the plurality of sub-streams to a plurality of remote devices, respectively;
monitoring performances of the remote devices; and
implementing, in response to a change to the performances of the remote devices, a modification to the code rates of the sub-streams.

17. The method of claim 16, wherein:
the partition control service is configured to determine a schema for partitioning the media stream, and
the method further comprises reporting, to the partition control service, the monitored performances of the remote devices, the partition control service determining the schema based on the monitored performances of the remote devices.

18. The method of claim 17, wherein:
the partition control service is further configured to identify the modification implemented to the code rates of the sub-streams, and
the method further comprises receiving, from the partition control service, an update to the schema.

19. The method of claim 16, wherein:
the multimedia session comprises a phone call, and
the media stream comprises a compressed and encoded bit stream.

20. The method of claim 16, wherein:
the media stream comprises a compressed and un-encoded bit stream, and each sub-stream comprises a compressed and encoded bit stream.

\* \* \* \* \*